United States Patent
Trundle et al.

(10) Patent No.: US 9,141,150 B1
(45) Date of Patent: Sep. 22, 2015

(54) AUTHENTICATION AND CONTROL INTERFACE OF A SECURITY SYSTEM

(75) Inventors: Stephen Scott Trundle, Falls Church, VA (US); Alison Jane Slavin, Vienna, VA (US)

(73) Assignee: Alarm.com Incorporated, Vienna, VA (US)

( * ) Notice: Subject to any disclaimer, the term of this patent is extended or adjusted under 35 U.S.C. 154(b) by 942 days.

(21) Appl. No.: 13/233,261

(22) Filed: Sep. 15, 2011

Related U.S. Application Data (60) Provisional application No. 61/383,075, filed on Sep. 15, 2010.

(51) Int. Cl.
G06F 1/16 (2006.01)
G06F 21/32 (2013.01)

(52) U.S. Cl.
CPC .............. *G06F 1/1694* (2013.01); *G06F 21/32* (2013.01)

(58) Field of Classification Search
CPC ........... G07C 9/00158; G07C 9/00134; G07C 9/00166; G07C 9/00182; G07C 9/00563; G07C 2009/00095; G06F 21/32; G06F 21/34; G06F 21/35; G06F 21/78; G06F 1/1694; G06K 9/00013; G08C 2201/03
USPC ........................................ 340/5.52–5.53, 576
See application file for complete search history.

(56) References Cited

U.S. PATENT DOCUMENTS

| | | | | |
|---|---|---|---|---|
| 5,719,950 | A * | 2/1998 | Osten et al. | 382/115 |
| 6,041,410 | A * | 3/2000 | Hsu et al. | 713/186 |
| 6,819,219 | B1 * | 11/2004 | Bolle et al. | 340/5.52 |
| 6,850,147 | B2 * | 2/2005 | Prokoski et al. | 340/5.53 |
| 7,111,174 | B2 * | 9/2006 | Hamid | 713/186 |
| 7,389,425 | B2 * | 6/2008 | Hasbun et al. | 713/186 |
| 7,697,735 | B2 * | 4/2010 | Adam et al. | 382/118 |
| 7,882,032 | B1 * | 2/2011 | Hoffman | 705/50 |
| 8,248,262 | B2 * | 8/2012 | Robison et al. | 340/686.1 |
| 8,452,978 | B2 * | 5/2013 | Alward et al. | 713/185 |
| 8,589,069 | B1 * | 11/2013 | Lehman | 701/438 |
| 8,627,235 | B2 * | 1/2014 | Chang et al. | 715/863 |
| 2003/0046552 | A1 * | 3/2003 | Hamid | 713/186 |
| 2005/0101314 | A1 * | 5/2005 | Levi | 455/423 |
| 2005/0171851 | A1 * | 8/2005 | Applebaum et al. | 705/18 |
| 2006/0176146 | A1 * | 8/2006 | Krishan et al. | 340/5.53 |
| 2006/0176167 | A1 * | 8/2006 | Dohrmann | 340/506 |
| 2008/0092245 | A1 * | 4/2008 | Alward et al. | 726/28 |
| 2008/0278283 | A1 * | 11/2008 | Slevin | 340/5.53 |
| 2010/0205667 | A1 * | 8/2010 | Anderson et al. | 726/19 |
| 2010/0315358 | A1 * | 12/2010 | Chang et al. | 345/173 |

\* cited by examiner

*Primary Examiner* — Firmin Backer
*Assistant Examiner* — Nay Tun
(74) *Attorney, Agent, or Firm* — Fish & Richardson P.C.

(57) ABSTRACT

Techniques are described for providing control of a security system. A user is authorized in the security system and user identification inputs, provided through an input unit of a personal mobile device of the authorized user of the security system, are accessed. One or more signatures of the authorized user are defined and stored in a signature map. Subsequently, user identification input is received from an unauthenticated user using the personal mobile device. The user identification input received from the unauthenticated user is compared to one or more defined signatures in the signature map. The unauthenticated user is determined to be the authorized user if the received user identification input matches one of the defined signatures. The unauthenticated user is allowed to control the security system based on the determination that the unauthenticated user is the authorized user.

20 Claims, 4 Drawing Sheets

AUTHENTICATION AND CONTROL INTERFACE OF A SECURITY SYSTEM

CROSS REFERENCE TO RELATED APPLICATIONS

The present application claims the benefit of U.S. Provisional Application No. 61/383,075, filed Sep. 15, 2010, which is incorporated herein by reference in its entirety for all purposes.

TECHNICAL FIELD

This disclosure relates to authentication and control of a security system.

BACKGROUND

Many people equip homes and businesses with security systems to provide increased security for their homes and businesses. A security system generally includes a control panel that a person may use to access and control the security system. For example, a person may either key in an access code or present a security device, such as a key fob, to the control panel of the security system. In such a system, a user memorizes and physically keys in access codes, or carries a separate security device, such as a key fob. Furthermore, the person is physically present at the control panel of the security system when controlling the security system.

SUMMARY

Techniques are described for authentication and control of a security system. For example, a personal mobile device may be used to remotely access and control a security system.

Implementations of the described techniques may include hardware, a method or process implemented at least partially in hardware, or a computer-readable storage medium encoded with executable instructions that, when executed by a processor, perform operations.

The details of one or more implementations are set forth in the accompanying drawings and the description below. Other features will be apparent from the description and drawings, and from the claims.

DETAILED DESCRIPTION

An Authentication and Control Interface of a security system, ("ACI") applies techniques for authenticating a user in a security system as well as sending user commands to access and control the security system. Unlike a traditional security system, which receives access codes via a key pad or touch bad, or which receives security information via a key fob to access the security system, the ACI system receives security information using an existing personal mobile device, such as a cell phone, a smart phone, a tablet PC, or a personal digital assistant ("PDA"). Thus, the user may be relieved from the burden of remembering security information, keying in access codes, or carrying key fobs. Taking advantage of the mobile device's own hardware, software, computing power and wireless communication capability, the ACI system may achieve convenience and may create the possibility for advanced level of security, personalized access, and more sophisticated control of the security system.

A security system has the ability to authenticate a legitimate user from others. Some security systems also allow legitimate authorized users to access or control devices located at the secured properties. A personal mobile device provides various ways to authenticate, e.g., uniquely identify a user. In the ACI system, the term "signature" is generally used as data that is specific to a particular user (e.g., an authorized user) or a group of particular users (e.g., a group of authorized users).

A user may be identified by the mobile device he or she is carrying, and can be authenticated by the unique identification numbers of the mobile device itself. A user may also be authenticated by characteristics or signatures of the user's voice. A voice sample through a microphone of the personal mobile device can be captured and then used to authenticate the user. A user may also be authenticated by being able to capture images of the right objects, in the right sequence. A user may also be identified by pointing to the right part of an image on the touch pad of the mobile device. A user may also be authenticated by making a special gesture, as captured by a gyroscope, or accelerometer of the mobile device. Further, a user may be identified by his or her biometric features. When the personal mobile device allows plug-ins, external security devices, such as finger print scanners, retina scanners, or other biometrics devices, can be used to capture biometric features of the user. The captured biometric features then may be used to authenticate the user. Finally, one or more of the authentication methods above can be combined to achieve a higher level of security.

Figure 1:
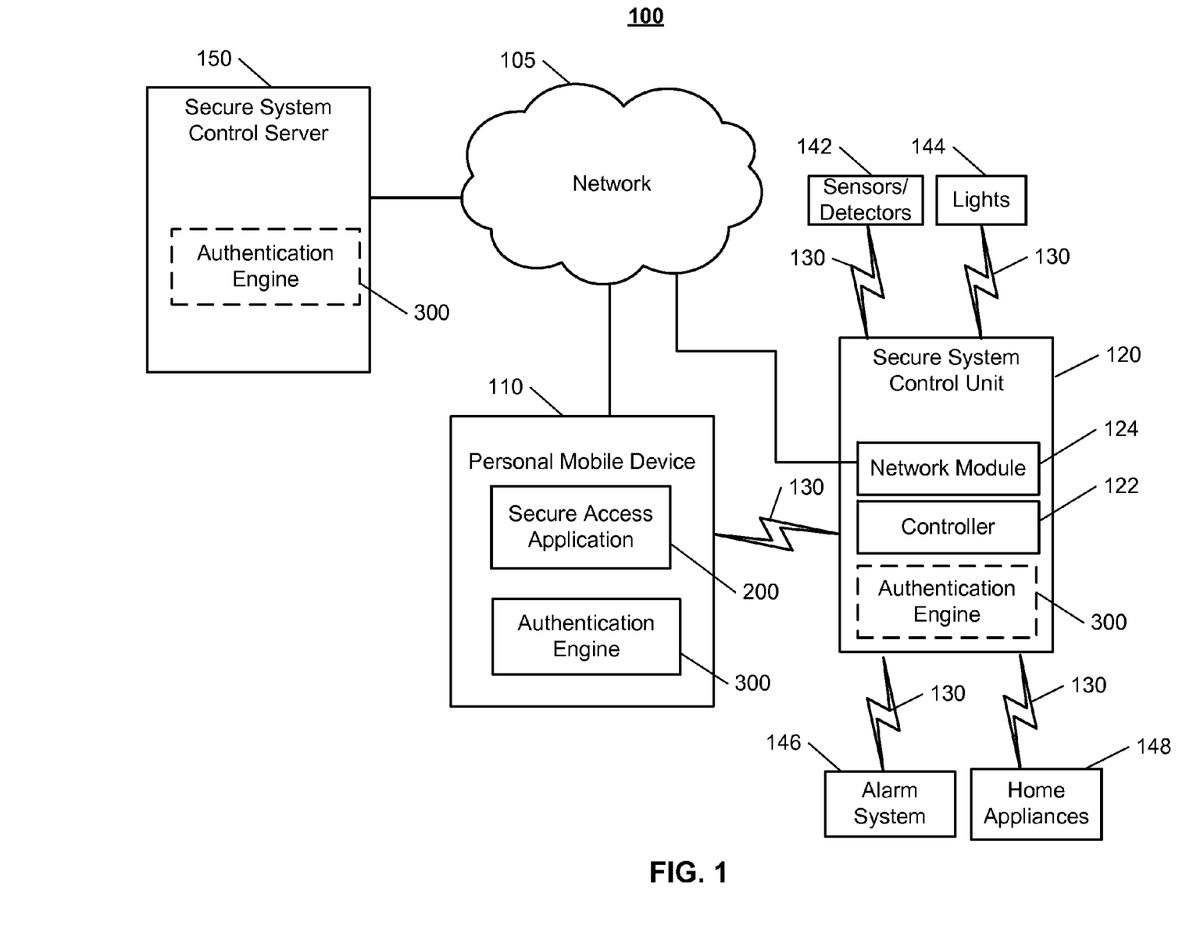
FIG. 1 illustrates an example of a security system 100 configured to authenticate a user by a personal mobile device 110.

FIG. 1 illustrates an example of a security system 100 configured to authenticate a user using a personal mobile device 110. Once authenticated, the user is able to access and control devices at secured properties controlled by the security system control unit 120, such as sensors/detectors 142, lights 144, alarm system 146, and home appliances 148. The security system 100 includes a network 105, one or more personal mobile devices 110, a security system control unit 120, and a security system control server 150. In some implementations, the network 105 facilitates communications between the security system control unit 120, the one or more personal mobile devices 110, and the security system control server 150. In some implementations, the communication links 130 facilitate communications between the security system control unit 120, the personal mobile device 110, as well as other devices at the secured properties, such as sensors/detectors 142, lights 144, alarm system 146, and home appliances 148.

The network 105 is configured to enable exchange of electronic communications between devices connected to the network 105. For example, the network 105 may be configured to enable exchange of electronic communications between personal mobile devices 110, the security system control server 150, and the security system control unit 120. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The one or more personal mobile devices 110 may connect locally to the security system control unit 120, its sensors, and other devices. The local connection may improve the speed of status and control communications because communicating through the network 105 with a remote server (e.g., security system control server 150) may be significantly slower. The local connection network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network.

The personal mobile device 110 may include a cell phone, a smart phone, a tablet PC, a personal digital assistant ("PDA"), or any other portable device configured to communicate over a network and display information. For example, implementations may include Blackberry-type devices (e.g., as provided by Research in Motion), electronic organizers, iPhone-type devices (e.g., as provided by Apple), iPod or iPad devices (e.g., as provided by Apple) or other portable music players, portable GPS devices, Wii Remote™ Controller, handheld or portable electronic devices for gaming, communications, or data organization, and other communication devices. The personal mobile device 110 may perform functions unrelated to the security system, such as placing personal telephone calls, playing music, playing video, displaying pictures, browsing the Internet, playing games, maintaining an electronic calendar, etc.

The security system control unit 120 includes a controller 122 and a network module 124. The controller 122 is configured to control a security system (e.g., a home alarm or security system) that includes the security system control unit 120. In some implementations, the controller 122 may include a processor or other control circuitry configured to execute instructions of a program that controls the operation of an alarm system 146. In these examples, the controller 122 may be configured to receive input from the personal mobile devices 110, the security system control server 150, sensors 142, detectors, or other devices included in the security system and controls the operations of lights 144, alarm system 146, and home appliances 148 (e.g., a thermostat, an audio player, etc.).

The network module 124 is a communication device configured to exchange communications over the network 105. The network module 124 may be a wireless communication module configured to exchange wireless communications over the network 105. For example, the network module 124 may be a wireless communication device configured to exchange communications over a wireless data channel and a wireless voice channel. In this example, the network module 124 may transmit alarm data over a wireless data channel and establish a two-way voice communication session over a wireless voice channel. The wireless communication device may include one or more of a GSM module, a radio modem, cellular transmission module, or any type of module configured to exchange communications in one of the following formats: GSM or GPRS, CDMA, EDGE or EGPRS, EV-DO or EVDO, UMTS, LTE, or IP.

The network module 124 also may be a wired communication module configured to exchange communications over the network 105 using a wired connection. For instance, the network module 124 may be a modem, a network interface card, or another type of network interface device. The network module 124 may be an Ethernet network card configured to enable the security system control unit 120 to communicate over a local area network and/or the Internet. The network module 124 also may be a voiceband modem configured to enable the alarm panel to communicate over the telephone lines of Plain Old Telephone Systems (POTS).

The security system includes the security system control unit 120, which receives input from one or more sensors or detectors. For example, the security system may include multiple sensors 142. The sensors 142 may include a contact sensor, a motion sensor, a glass break sensor, or any other type of sensor included in an alarm system or security system. The sensors 142 also may include an environmental sensor, such as a temperature sensor, a water sensor, a rain sensor, a wind sensor, a light sensor, a smoke detector, a carbon monoxide detector, an air quality sensor, etc. The sensors 142 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 142 may include a radio-frequency identification (RFID) sensor that identifies a particular article that includes a pre-assigned RFID tag.

The security system control unit 120 may also receive inputs from one or more personal mobile devices 110. In some implementations, the one or more personal mobile devices 110 communicate with the security system control unit 120 using the communication link 130. In one implementation, the communication link 130 is a direct machine-to-machine connection. The communication link 130 may apply various local wireless protocols such as wifi, Bluetooth, z-wave, Zigbee, HomePlug (ethernet over powerline), or wired protocols such as Ethernet and USB, or other protocols such as TCP/IP, GSM/GPRS, CDMA, WiMax, open band 900 Mhz, or other proprietary RF protocols, to connect to one or more personal mobile devices 110. The communication link 130 may be encrypted with various methods to ensure secure authentication that cannot easily be hacked.

The security system control unit 120 may receive information regarding data from the one or more personal mobile devices 110. For example, the security system control unit 120 may receive electronic communications with respect to various signatures captured by the personal mobile device 110.

A signature generally refers to a user input or a combination of user inputs. A signature is identified if it is found to match a pre-defined user input or a combination of user inputs for a particular user. A signature can be in a form of sound, image, touch point of a particular part of an image, a gesture, or some other form of non-text input that can be captured by the personal mobile device 110 through an input unit of the personal mobile device other than a keypad that enables entry of alphanumeric characters. A signature can also be in the form of a biometric feature, such as a finger print, a retina image, a pulse pattern, a skin cell structure, etc. A live signature is usually captured and compared to its pre-defined form for recognition. A signature can be used to authenticate a user. A signature can also be used to signify a command of a user in an attempt to operate or control the devices via the security system control unit 120. For example, commands may include lock or unlock the alarm system 146, turn on or turn off lights 144, power on or power off a home appliance 148.

Figure 3:
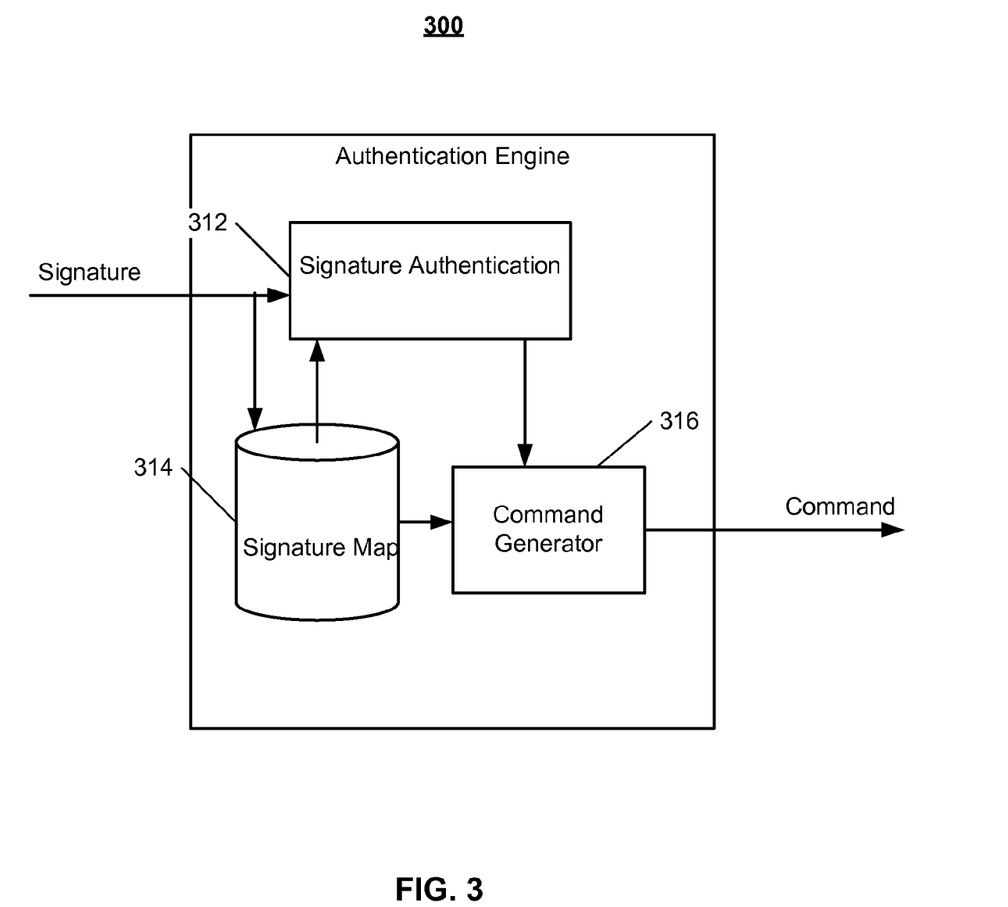
FIG. 3 illustrates an authentication engine 300.

The security system control unit 120 may authenticate a user after analyzing a received signature in its authentication engine 300. Once authenticated, the security system control unit 120 may translate subsequent signatures from the authenticated user into commands for the security system control unit 120, such as, lock or unlock the alarm system 146, turn on or off lights 144, play or stop music of an audio device 148. As shown by the representation of the authentication engine 300 at each of the personal mobile device 110, the security system control unit 120, and the security system control server 150, the authentication engine 300 may be located at any one or more of the personal mobile device 110, the security system control unit 120, and the security system control server 150. For example, functionality of the authentication engine 300 may be performed by only one of the personal mobile device 110, the security system control unit 120, and the security system control server 150. In another example, functionality of the authentication engine 300 also may be distributed over two or more of the personal mobile device 110, the security system control unit 120, and the security system control server 150.

The security system control unit 120 may also receive inputs from the security system control server 150. The security system control server 150 is a system configured to provide monitoring services by exchanging electronic communications with the security system control unit 120 and the one or more personal mobile devices 110 over the network 105. For example, the security system control server 150 may be configured to monitor events generated by the security system control unit 120. In this example, the security system control server 150 may exchange electronic communications with the network module 124 included in the security system control unit 120 to receive information regarding alarm events detected by the security system control unit 120.

The security system control server 150 also may receive information from the one or more personal mobile devices 110. For example, the security system control server 150 may receive electronic communications with respect to various signatures captured by the personal mobile device 110 and may process these signatures via the authentication engine 300 to authenticate the user. The security system control server 150 may also translate subsequent signatures from an authenticated personal mobile device 110 into commands to perform certain tasks via the security system control unit 120, such as, lock or unlock the alarm system 146, turn on or off lights 144, play or stop music of an audio device, or control the operations of any home appliances 148.

In some implementations, the authentication engine 300 is in the personal mobile device 110. The captured user signatures may be analyzed by an authentication engine 300. As a result, an authenticated user's command is transmitted from the personal mobile device 110 to the security system control unit 120. In other implementations, the authentication engine 300 is in the security system control unit 120. In these implementations, the personal mobile device 110 sends captured user signatures directly to the security system control unit 120. In some other implementations, the authentication engine 300 is in the security system control server 150. In these implementations, the security system control server 150 receives captured user signatures from the personal mobile device 110, and sends authenticated user commands from the security system control server 150 to the security system control unit 120.

Figure 2:
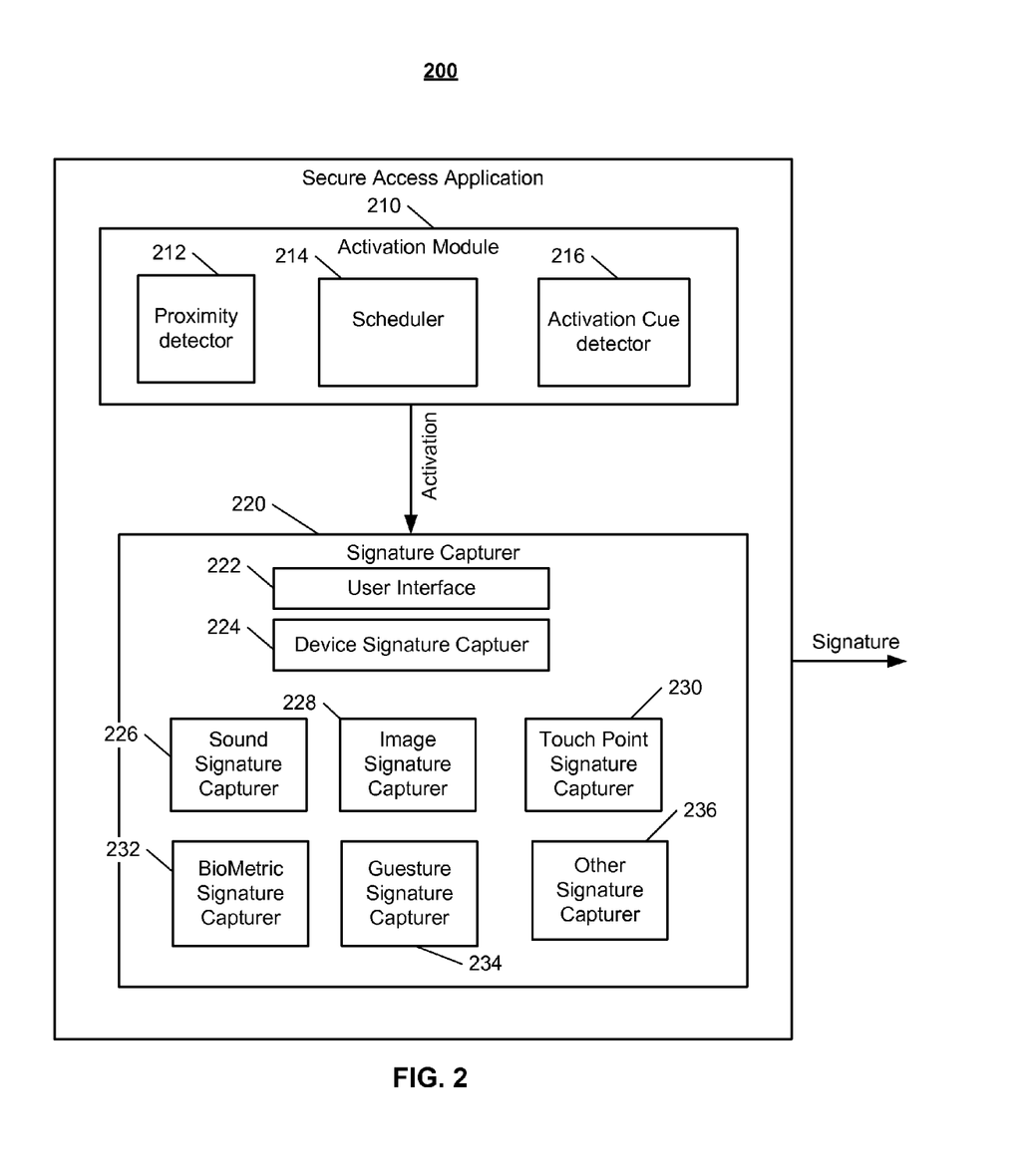
FIG. 2 illustrates a secure access application 200 that runs on a personal mobile device.

FIG. 2 illustrates a secure access application 200 that runs on a personal mobile device. The secure access application 200 enables the user of the personal mobile device to be authenticated and to access or control devices at the secured properties controlled by the security system control unit. User authentication inputs or user commands may be captured in the form of user signatures by a signature capturer 220.

The secure access application 200 includes an activation module 210. In some implementations, the secure access application 200 may run on the personal mobile device 110 continuously. In other implementations, the secure access application 200 may be dormant normally in order to conserve energy, or to prolong the battery life of the personal mobile device 110. In these implementations, the secure access application 200 uses an activation module 210, which activates the secure access application 200 under certain conditions.

The activation module 210 may include a proximity detector 212, which can be configured to activate the secure access application 200 when the user with personal mobile device 110 is in close proximity to the secured property. For example, the proximity detector 212 may periodically identify the current location of the personal mobile device 110, and calculate the distance of the current location to the physical location of the secured property, or any pre-defined location. In one implementation, the proximity detector 212 uses local RF detection. In another implementation, the proximity detector 212 uses GPS based proximity detection. In yet another implementation, the proximity detector 212 uses cellular tower based proximity detection.

The activation module 210 may include a scheduler 214, which can be configured to activate the secure access application 200 on a pre-defined schedule. For example, a user routinely leaves home around 7:00 am, and comes home around 6:00 pm. The user can set the scheduler to activate the secure access application 200 around these set times. As a result, secure access application 200 is activated to capture and send user commands, such as lock or unlock the alarm system or turn off or turn on the lights controlled by the security system control unit 120, only during the scheduled time period.

The activation module 210 may also include an activation cue detector 216, which can be configured to activate the secure access application 200 on a pre-defined cue. For example, the sound of the car engine turning off, or the sound of a car door as it closes can be a cue to activate the secure access application 200.

The activation module 210 may also activate the secure access application 200 using a combination of one or more detector modules, such as the proximity detector 202, scheduler 214 and activation cue detector 216. For example, only on weekdays between 6:00 pm to 8:00 pm, when the personal mobile device is within 100 feet from the front door of the house, the sound of the car engine turning off will activate the secure access application 200.

The secure access application 200 also includes a signature capturer 220, which captures user inputs in various forms. The signature capturer 220 may include a user interface 222. The user interface 222 may be displayed upon activation by the activation module 210 or upon activation by the user manually.

The user interface 222 may solicit the user for signatures for authentication or subsequent commands. The user interface 222 may also provide an interface to receive user signatures. The user interface 222 may also prompt feedback to the user, such as whether authentication is a success, or else reasons of failure or a request to re-authenticate. The user interface may also display the command that is being recognized from a signature, and subsequently allow user input to confirm or deny sending this command to the security system control unit 120. The user interface 222 may present a particular image on a touch screen for the user to touch or point to; the user interface 222 may also display prompting messages for the user to make signatures, such as to speak certain words, point and shoot an image, scan his finger or retina, or make certain gestures.

The functionality of the signature capturer 220 depends on the existing hardware and software of the personal mobile device 110. For example, having a camera allows for input of image signatures, having a microphone allows for recording of sound signatures, having a touch screen allows for accepting touch and point signatures, having a tilt sensor (e.g., gyroscope, or accelerometer) may allow for gesture signatures, having a GPS system allows for location information being part of the signature, etc. Additionally, the software or firmware of the personal mobile device is operable to be integrated with application software, such as the signature capturer 220.

The signature capturer 220 may include a device signature capturer 224, which authenticates the user based on the data of the device itself. In one example, a device signature includes a device ID that is unique to that device, such as a mobile phone number, a machine ID or an IP address of the personal mobile device 110. In another example, a device signature includes a secret code that the user saved to the personal mobile device 110. In still another example, a device signature includes a web site address that is on top of the user's favorite list in a web browser. When activated, the device signature capturer 224 will obtain the device data, sometimes encrypt it for security reasons, and then send it out for authentication in an authentication engine 300.

The signature capturer 220 may include a sound signature capturer 226 that leverages the speaker or microphone capabilities of the user's personal mobile device 110. Once activated, the sound signature capturer 226 listens and records sounds that the user makes.

A sound signature may include spoken words in the user's own voice. A sound signature may be authenticated using human voice recognition. Additionally, the user may have a number of sound signatures that each correlate to a command on the security system. In one example, the user may say a password to authenticate himself or herself. In another example, the user may say "disarm" to disarm the alarm system 146 or the user may say "panic" to set the alarm system 146 in panic mode. In another example, instead of asking the user for a password, the personal mobile device 110 prompts the user to read a machine generated random word to collect a voice sample of the user. The user can be authenticated by his or her voice sample.

The signature capturer 220 may include an image signature capturer 228 that leverages the built-in camera of the personal mobile device 110. An image signature capturer 228 may instruct the user to take an image or a sequence of images using the personal mobile device 110. For example, the user may take a photo of a "key object," such as a unique stone or art object in the garden, or a piece of personal jewelry. In another example, the user may take a sequence of photos of a sequence of key objects to improve security.

The signature capturer 220 may include a touch point capturer 230, which instructs the user to touch or point to a part of an underlying image on the touch pad of the personal mobile device 110. For example, an underlying image may be a family photo of mom, dad, baby and a dog. The user may need to tap on the dog's nose twice and then the mother's shoe to send a disarm command to the security system. In another example, the user points to or taps the baby's eyes to send a command to turn off the lights or the user points to or taps the father's ears twice to turn on the audio player.

The signature capturer 220 may include a biometric signature capturer 232, which instructs the user to connect the personal mobile device 110 to a certain biometric device. A biometric device may include a finger print scanner, a retina scanner, a pulse monitor, a skin analyzer, or other device capable of capturing a biometric feature. In some implementations, the biometric signature capturer 232 simply requires the personal mobile device 110 to have the software of a finger print scanner or a retina scanner and uses its built-in camera as the scanning device. Because of the uniqueness of each person's biometric feature, such as one's finger print, retina, pulse pattern, and skin cell cellular structure, the biometric signature may achieve a high level of security. Importing the security of a biometric device to the security system 100 via a compatible personal mobile device may improve the overall security level of the security system 100 in a simple and cost effective way.

The signature capturer 220 may include a gesture signature capturer 234, which captures user's arm or hand movement made while holding the personal mobile device 110. In one implementation, the user's personal mobile device 110 contains one or more of a gyroscope, an accelerometer, or a similar sensor. The signature capturer 220 application allows the user to create a "gesture signature". A gesture signature is derived by putting the device into a learn mode and then instructing the user to make a set of gestures that they can easily remember with a hand holding the device. These gestures, if unique, are then recorded as a unique digital signature for the user. The learn mode may also ask them to record a second, "reset" gesture. The reset gesture is one that the user could make to put the device in a mode where it will then seek to recognize the signature gesture that the user will next make.

In one example, when the user makes a signature gesture using his personal mobile device, the alarm system is armed or disarmed. In another example, the user may sign his name in the air with the personal mobile device 110 in order to authenticate himself or herself. In another example, the user may wave the personal mobile device 110 in a downward motion as a command to turn down the volume of an audio device 148 or turn on the lights 144, and may wave in an upward motion as a command to turn up the volume of an audio device 148 or turn off the lights 144. In still another example, the user may make a check mark gesture to unlock the alarm system 146, and make a cross mark gesture to lock the alarm system 146.

In still another example, by making a certain gesture using the personal mobile device 110, the user might issue a silent panic code or an active panic code. This solution is particularly useful for silent panic code generation, as it could allow a person in duress to signal the central station of their duress without the person who is holding them captive knowing that they have actually issued a silent panic command.

The signature capturer 220 may include some other signature capturer 236, which instructs the user to input certain ways in order to be authenticated or to send certain commands.

Additionally, the signature capturer 220 may capture signatures that require a combination of one or more forms of signatures captured by various signature capturers: device signature capturer 224, sound signature capturer 226, image signature capturer 228, touch point signature capturer 230, biometric signature capture 232, gesture signature capturer 234 and other signature capturer 236. Using a combination of multiple, different signature capturers may reduce the likelihood of a false signature being detected.

In one example, a signature may require both a device signature 224 and a gesture signature 234: a user using a cell phone that matches a predetermined phone number by the device signature capturer 224, who makes a gesture that matches a learned signature as determined by the gesture signature capturer 234 can access and control one or more of the sensors 142, lights 144, alarm system 146 or home appliances 148, through the security system control unit 120.

FIG. 3 illustrates an authentication engine 300, which receives captured signatures, analyzes them and determines whether to authenticate the user and whether to issue a specific command to the security system control unit 120. The authentication engine 300 includes a signature map 314 that stores all pre-defined signatures of one or more users. The authentication engine 300 also includes a signature authentication module 312. The signature authentication module 312 analyzes a signature based on the pre-defined signatures in the signature map 314. The signature authentication module 312 may determine whether the signature matches a particular user's authentication signature and authenticates the user based on the determination of whether the signature matches the particular user's authentication signature. The signature authentication module 312 may also pass subsequent signatures of an authenticated user to a command generator 316. The command generator 316 receives a signature from an authenticated user and translates the signature to a particular command using the pre-defined signature information in the signature map 314. The command generator 316 is operable to send the command, sometimes encrypted, to the security system control unit 120.

Figure 4:
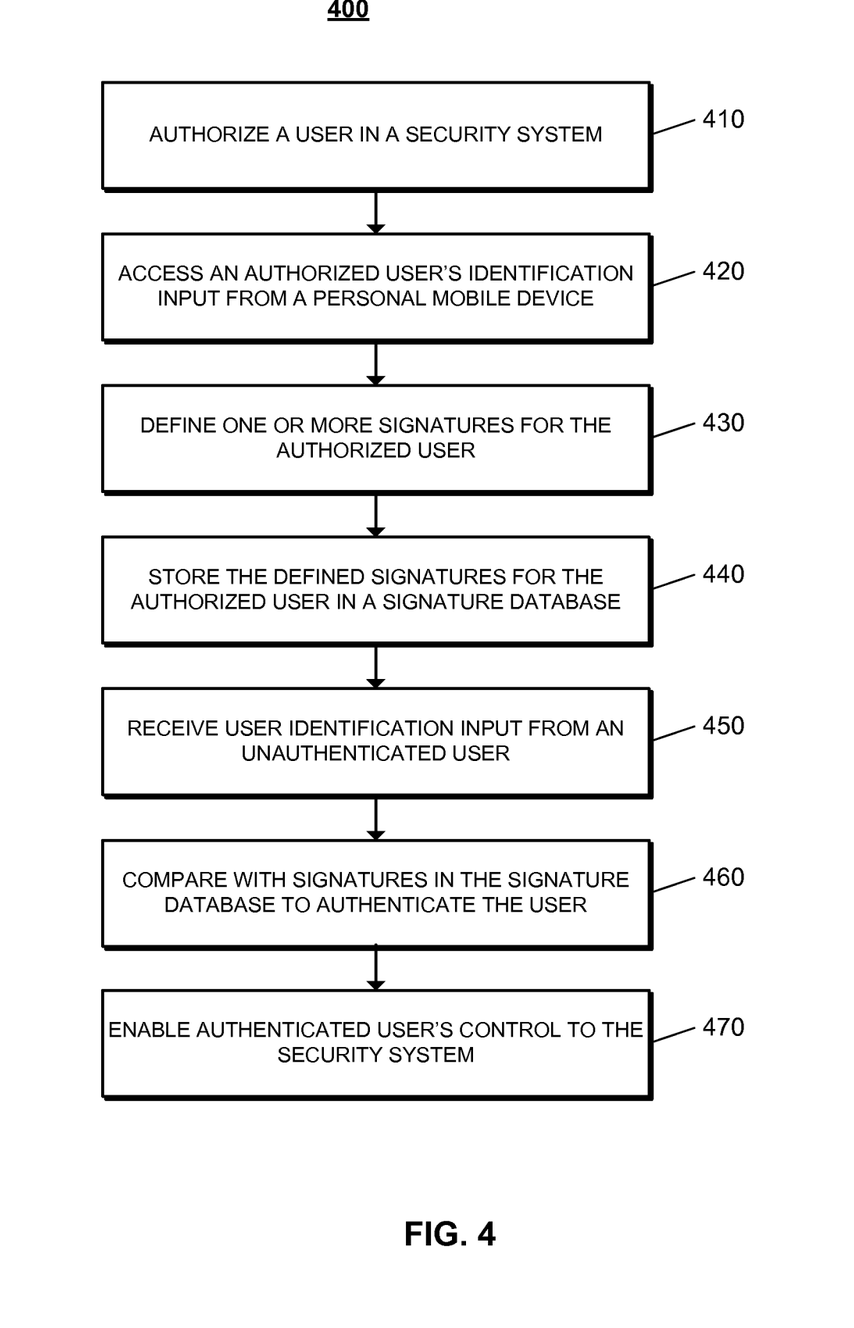
FIG. 4 illustrates an example process 400 for enabling an authorized user to control the security system using a person mobile device.

FIG. 4 illustrates an example process 400 for enabling an authorized user to control a security system using a personal mobile device. The security control system 100 authorizes a user in a security system (410). For example, the user manually enters an access code in the key pad or touch pad of the security system. In another example, the user manually holds a security device, such as a key fob, to a sensor of the security system.

Once authorized, the security system enables communication with the user via the user's personal mobile device 110. In one example, the user registers the personal mobile device 110 to the security system by entering the cell phone number, a device id or other identification number of the personal mobile device 110 using the key pad or touch pad of the security system. In another example, the user registers the personal mobile device 110 to the security system by performing a pairing process (e.g., a Bluetooth pairing process) between the personal mobile device 110 and a communication unit of the security system when the personal mobile device 110 is located within a property monitored by the security system.

Once registered, the security system enables communication with the personal mobile device 110. In one implementation, the security system sends a text message to the personal mobile device 110 that indicates to the user that the personal mobile device 110 is now registered in the security system. The text message may also remind the user to activate the secure access application 200 and to define user signatures in order to access and control the security system in the future.

The security control system 100 accesses an authorized user's identification input from a personal device 110 (420). The user may make various forms of user identification inputs that are used in making a signature that uniquely identifies the user. Such user identification input can be of various forms, including sound input, image input, touch point input, biometric feature input, gesture input, etc. In one example, the authorized user manually activates the secure access application 200 in the personal mobile device 110. Via user interface 222, the user may elect to make one or more forms of user identification input.

The user identification inputs are stored in the personal mobile device 110 and are accessible for the user to define one or more signatures for the authorized user (430). The personal mobile device 110 may define any type of signature that the user choses and the defined one or more signatures may be used in the future to authenticate the user and perform commands related to the security system. In some examples, the personal mobile device 110 may require an authentication signature defined to authenticate the user to be sufficiently distinct to reduce the likelihood of someone guessing the authentication signature. In these examples, the personal mobile device 110 may require the authentication signature to have multiple types of user inputs and/or to have more than a threshold number of verification points. The personal mobile device 110 may accept authentication signatures that are sufficiently distinct and may reject simple signatures that are determined to be too easy to guess.

In one example, the user may activate the sound signature capturer 226 in a learn mode and record a voice sample of him or her speaking certain phrases using a microphone of the personal mobile device 110. The recorded voice sample can be accessed and used to define the user's voice signature. A user may record a number of voice samples by saying different words, phrases, or sentences. For example, a user may say his own name "This is John Smith"; a user may say "disarm;" a user may simply read a word that is prompted by the user interface 222. Each recorded voice sample can be a sound signature of the user.

In another example, the user may activate the image signature capture 228 in a learn mode, take a photo of an object and save the image. The saved image can be accessed and used to define an image signature of the user.

In another example, the user may activate the touch point signature capturer 230 in a learn mode, select an image from the personal mobile device 110, make one or more touch points on an image, and save the one or more touch points as an touch point signature of the user. The user may also require the sequence of the touch points being part of the user's touch point signature.

In another example, a user activates the gesture signature capturer 234 in a learn mode to create gesture signatures. For example, the user may hold the personal mobile device 110 and start to make arm or hand movements, which he could later repeat with reasonable accuracy. For example, the user may make a gesture that resembles him signing his name in the air; the user may make a gesture in an upward motion or downward motion of a certain angle; the user may use the personal mobile device to trace his own profile. Each recorded gesture can be a gesture signature for the user.

In some implementations, the user may compile a sequence or combination signature of various forms as described above to create new signatures. For example, for added security, a user may define a signature that includes both a gesture and a voice signature: a gesture of the user signing his name, and a voice signature of the user speaking "I am John Smith". In another example, a user may define a signature that includes two gesture signatures: one gesture signature includes the user signing his name in the air; the second gesture signature includes the user signing "SOS" in the air in an attempt to trigger the panic mode in the security system in silence.

The security control system 100 stores the defined signatures for the authorized user in a signature map 314 (440). In one implementation, the signature map 314 is located in personal mobile device 110. In this implementation, the newly defined signatures are saved in the signature map directly.

In another implementation, the signature map 314 is located in the secure system control unit 120. The security system enables the registered personal mobile device 110 to establish a secure communication channel between the registered personal mobile device 110 and the secure system control unit 120 using the communication link 130. The personal mobile device 110 transmits newly created signatures to the signature map 314 via the communication link 130. In another implementation, the signature map 314 is located in the secure system control server 150. The security system enables the authorized user to establish a secure communication channel between the user's personal mobile device 110 and the secure system control server 150. The personal mobile device 110 transmits newly created signatures to the signature map 314 via network 105 to the secure system control server 150.

The security control system 100 receives user identification input from an unauthenticated user (450). For example, a person may be trying to control the security system using a registered personal mobile device 110. In this example, the person may be travelling out of town, but does not want to disarm his or her home security system. His or her dog walker may need to get into his or her home to get the dog out. The person may disarm his or her home security system remotely, using his personal mobile device 110 to perform a signature that authenticates the user and controls the security system to disarm.

In this example, the person activates the secure access application 200 and makes one signature to authenticate the person to the security system. For example, the person makes a sign of his or her name using the personal mobile device 110, in a way that is similar to the pre-defined gesture signature registered to authenticate the person. The secure access application 200 captures a gesture signature in its signature capture 220.

The security control system 100 compares the user identification input with the signatures in the signature map 314 to authenticate the user (460). As in the example above, the captured gesture signature is compared with one or more existing gestures in the signature map. If the captured gesture signature matches any one of the defined signatures (or a particular authentication signature), the person is authenticated as the authorized user.

The security control system 100 enables the authenticated use to control the security system (470). For example, an authenticated user may disarm the security system by speaking to his or her personal mobile device, "disarm." If the authenticated user is able to speak similarly as compared to a voice signature that he has created earlier for a command to disarm the security system, the authentication engine 310 may generate a command to disarm the security system. The disarm command is sent to the secure system control unit 120 and subsequently disarms the security system.

Described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language or in assembly or machine language if desired; and in any case, the language may be a compiled or interpreted language. Suitable processors include, for example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. A method for controlling a security system comprising:
   authorizing a user in the security system;
   accessing user identification input rendered by the authorized user of the security system using a personal mobile device, including recording, using a tilt sensor of the personal mobile device, a first gesture signature input to authenticate the authorized user and enable the security system, and a second gesture signature input to authenticate the authorized user and disable the security system, the first and second gesture signature inputs having been defined by movement of the personal mobile device in a particular pattern using a set of user gestures performed by the authorized user of the security system while holding the personal mobile device;
   defining, based on the accessed user identification input, signatures of the authorized user of the security system, the defined signatures including a first gesture signature based on the recorded first gesture signature input rendered by the authorized user and a second gesture signature based on the recorded second gesture signature input rendered by the authorized user, each of the signatures comprising at least one of:
   a sound inputted through a microphone of the personal mobile device,
   an image captured using a camera of the personal mobile device, a touch point inputted using a touch screen of the personal mobile device,
a gesture measured using the tilt sensor of the personal mobile device for at least the gesture signature,
a biometric feature of the authorized user inputted at the personal mobile device, or
any sequence or combination of a sound inputted through the microphone of the personal mobile device, an image captured using the camera of the personal mobile device, a touch point inputted using the touch screen of the personal mobile device, a gesture measured using the tilt sensor of the personal mobile device, and a biometric feature of the authorized user inputted at the personal mobile device;
storing, in a signature database, the defined signatures;
subsequent to storing, in the signature database, the defined signatures, receiving user identification input rendered by an unauthenticated user using the personal mobile device by receiving, using the tilt sensor of the personal mobile device, a gesture authentication input rendered by an unauthenticated user moving the personal mobile device in a pattern that defines the gesture authentication input;
based on receiving the user identification input rendered by the unauthenticated user using the personal mobile device, accessing, from the signature database, signature data corresponding to at least one of the defined signatures including the defined first gesture signature and the defined second gesture signature;
comparing the accessed signature data with the received gesture authentication input rendered by the unauthenticated user moving the personal mobile device in the pattern that defines the gesture authentication input;
based on comparison results, determining whether the received gesture authentication input rendered by the unauthenticated user moving the personal mobile device in the pattern that defines the gesture authentication input matches the defined first gesture signature or the defined second gesture signature;
authenticating the unauthenticated user as the authorized user of the security system based on a determination that the received gesture authentication input rendered by the unauthenticated user moving the personal mobile device in the pattern that defines the gesture authentication input matches the defined first gesture signature or the defined second gesture signature; and
in response to the authentication of the unauthenticated user as the authorized user of the security system:
enabling control of the security system based on the gesture authentication input matching the defined first gesture signature, the enablement of control of the security system allows one or more commands inputted to the personal mobile device at a location that is remote from a property monitored by the security system, and
disabling the security system based on the gesture authentication input matching the defined second gesture signature.

2. The method of claim 1, wherein authenticating the unauthenticated user as the authorized user of the security system is handled by the personal mobile device.

3. The method of claim 1, wherein authenticating the unauthenticated user as the authorized user of the security system is handled by the security system.

4. The method of claim 1, wherein authenticating the unauthenticated user as the authorized user of the security system is handled by a security system control server based on electronic communications exchanged, via a wireless network, between the security system control server, the personal mobile device, and the security system.

5. The method of claim 1:
wherein accessing user identification input rendered by the authorized user of the security system comprises recording, using a microphone of the personal mobile device, a sound input made by the authorized user of the security system; and
wherein defining signatures comprises defining a sound signature based on the recorded sound input made by the authorized user.

6. The method of claim 1:
wherein accessing user identification input rendered by the authorized user of the security system comprises recording, using a camera of the personal mobile device, an image input rendered by the authorized user of the security system; and
wherein defining signatures comprises defining an image signature based on the recorded image input rendered by the authorized user.

7. The method of claim 1:
wherein accessing user identification input rendered by the authorized user of the security system comprises recording, using a touch screen interface of the personal mobile device, a touch point input rendered by the authorized user of the security system; and
wherein defining signatures comprises defining a touch point signature based on the recorded touch point input rendered by the authorized user.

8. The method of claim 1:
wherein accessing user identification input rendered by the authorized user of the security system comprises recording, using a biometric device associated with the personal mobile device, a biometric input rendered by the authorized user of the security system; and
wherein defining signatures comprises defining a biometric signature based on the recorded biometric input rendered by the authorized user.

9. The method of claim 1:
wherein accessing user identification input rendered by the authorized user of the security system comprises recording a non-text input rendered by the authorized user of the security system; and
wherein defining signatures comprises defining a non-text signature based on the recorded non-text input rendered by the authorized user.

10. The method of claim 1 wherein receiving user identification input rendered by an unauthenticated user using the personal mobile device comprises:
monitoring a distance of the personal mobile device from the security system;
comparing the monitored distance of the personal mobile device from the security system with a predetermined value;
determining whether the distance of personal mobile device from the security system is within the predetermined value; and
in response to a determination that distance of the personal mobile device is within the predetermined value, activating the personal mobile device to receive user identification input rendered by the unauthenticated user.

11. The method of claim 1 wherein receiving user identification input rendered by an unauthenticated user using the personal mobile device comprises:
defining a time schedule that includes one or more time intervals for a predetermined period of time;

determining whether a current time is within a defined time interval in the time schedule; and in response to a determination that the current time is within a defined time interval in the time schedule, activating the personal mobile device to receive user identification input rendered by the unauthenticated user.

12. The method of claim 1 wherein receiving user identification input rendered by an unauthenticated user using the personal mobile device comprises:

recording one or more activation cues rendered by the authorized user of the security system;

detecting an activation cue using the personal mobile device;

comparing the detected activation cue with the one or more recorded activation cues rendered by the authorized user of the security system; and in response to a determination that the detected activation cue matches one of the recorded activation cues rendered by the authorized user of the security system, activating the personal mobile device to receive user identification input rendered by the unauthenticated user.

13. The method of claim 12, wherein detecting an activation cue using the personal mobile device comprises detecting an activation cue that includes a sound of a car engine shutting off.

14. The method of claim 1 wherein enabling control of the security system comprises arming the security system based on one or more commands inputted to the personal mobile device at a location that is remote from a property monitored by the security system.

15. The method of claim 1 wherein disabling the security system comprises disarming the security system.

16. The method of claim 1 wherein enabling control of the security system comprises setting a silent panic mode command in the security system based on a gesture made using the personal mobile device.

17. The method of claim 1 wherein recording, using the tilt sensor of the personal mobile device, the first gesture signature input and the second gesture signature input comprises capturing, using the tilt sensor of the personal mobile device, arm or hand movement made while the authorized user of the security system is holding the personal mobile device.

18. An electronic system comprising:

at least one processor; and at least one computer-readable medium coupled to the at least one processor having stored thereon instructions which, when executed by the at least one processor, causes the at least one processor to perform operations comprising:

authorizing a user in the security system;

accessing user identification input rendered by the authorized user of the security system using a personal mobile device, including recording, using a tilt sensor of the personal mobile device, a first gesture signature input to authenticate the authorized user and enable the security system, and a second gesture signature input to authenticate the authorized user and disable the security system, the first and second gesture signature inputs having been defined by movement of the personal mobile device in a particular pattern using a set of user gestures performed by the authorized user of the security system while holding the personal mobile device;

defining, based on the accessed user identification input, signatures of the authorized user of the security system, the defined signatures including a first gesture signature based on the recorded first gesture signature input rendered by the authorized user and a second gesture signature based on the recorded second gesture signature input rendered by the authorized user, each of the signatures comprising at least one of:

a sound inputted through a microphone of the personal mobile device, an image captured using a camera of the personal mobile device, a touch point inputted using a touch screen of the personal mobile device, a gesture measured using the tilt sensor of the personal mobile device for at least the gesture signature, a biometric feature of the authorized user inputted at the personal mobile device, or any sequence or combination of a sound inputted through the microphone of the personal mobile device, an image captured using the camera of the personal mobile device, a touch point inputted using the touch screen of the personal mobile device, a gesture measured using the tilt sensor of the personal mobile device, and a biometric feature of the authorized user inputted at the personal mobile device;

storing, in a signature map, the defined signatures;

subsequent to storing, in the signature map, the defined signatures, receiving user identification input rendered by an unauthenticated user using the personal mobile device by receiving, using the tilt sensor of the personal mobile device, a gesture authentication input rendered by an unauthenticated user moving the personal mobile device in a pattern that defines the gesture authentication input;

based on receiving the user identification input rendered by the unauthenticated user using the personal mobile device, accessing, from the signature database, signature data corresponding to at least one of the defined signatures including the defined first gesture signature and the defined second gesture signature;

comparing the accessed signature data with the received gesture authentication input rendered by the unauthenticated user moving the personal mobile device in the pattern that defines the gesture authentication input;

based on comparison results, determining whether the received gesture authentication input rendered by the unauthenticated user moving the personal mobile device in the pattern that defines the gesture authentication input matches the defined first gesture signature or the defined second gesture signature;

authenticating the unauthenticated user as the authorized user of the security system based on a determination that the received gesture authentication input rendered by the unauthenticated user moving the personal mobile device in the pattern that defines the gesture authentication input matches the defined first gesture signature or the defined second gesture signature; and in response to the authentication of the unauthenticated user as the authorized user of the security system:

enabling control of the security system based on the gesture authentication input matching the defined first gesture signature, the enablement of control of the security system allows one or more commands inputted to the personal mobile device at a location that is remote from a property monitored by the security system, and disabling the security system based on the gesture authentication input matching the defined second gesture signature.

19. A control system comprising:

a security system operable to authorize a user to control the security system;

accessing user identification input rendered by the authorized user of the security system using a personal mobile device, including recording, using a tilt sensor of the personal mobile device, a first gesture signature input to authenticate the authorized user and enable the security system, and a second gesture signature input to authenticate the authorized user and disable the security system, the first and second gesture signature inputs having been defined by movement of the personal mobile device in a particular pattern using a set of user gestures performed by the authorized user of the security system while holding the personal mobile device;

wherein the secure access application in the personal mobile device is operable to define, based on the accessed user identification input, signatures of the authorized user of the security system, the defined signatures including a first gesture signature based on the recorded first gesture signature input rendered by the authorized user and a second gesture signature based on the recorded second gesture signature input rendered by the authorized user, each of the signatures comprising at least one of:

a sound inputted through a microphone of the personal mobile device, an image captured using a camera of the personal mobile device, a touch point inputted using a touch screen of the personal mobile device, a gesture measured using the tilt sensor of the personal mobile device for at least the gesture signature, a biometric feature of the authorized user inputted at the personal mobile device, or any sequence or combination of a sound inputted through the microphone of the personal mobile device, an image captured using the camera of the personal mobile device, a touch point inputted using the touch screen of the personal mobile device, a gesture measured using the tilt sensor of the personal mobile device, and a biometric feature of the authorized user inputted at the personal mobile device;

a signature map operable to store the defined signatures;

an authentication engine operable:

to receive user identification input rendered by an unauthenticated user using the personal mobile device by receiving, using the tilt sensor of the personal mobile device, a gesture authentication input rendered by an unauthenticated user moving the personal mobile device in a pattern that defines the gesture authentication input;

to access, from the signature map, signature data corresponding to at least one of the defined signatures including the defined first gesture signature and the defined second gesture signature, to compare the accessed signature data with the received gesture authentication input rendered by the unauthenticated user moving the personal mobile device in the pattern that defines the gesture authentication input, to determine, based on comparison results, whether the received gesture authentication input rendered by the unauthenticated user moving the personal mobile device in the pattern that defines the gesture authentication input matches the defined first gesture signature or the defined second gesture signature, to authenticate the unauthenticated user as the authorized user of the security system based on a determination that the received gesture authentication input rendered by the unauthenticated user moving the personal mobile device in the pattern that defines the gesture authentication input matches the defined first gesture signature or the defined second gesture signature, and to, in response to the authentication of the unauthenticated user as the authorized user of the security system:

enable control of the security system based on the gesture authentication input matching the defined first gesture signature, the enablement of control of the security system allows one or more commands inputted to the personal mobile device at a location that is remote from a property monitored by the security system, and disable the security system based on the gesture authentication input matching the defined second gesture signature.

20. The system of claim 19 wherein the authentication engine is located at the personal mobile device.

* * * * *